(12) United States Patent
Bercovich et al.

(10) Patent No.: US 8,234,452 B2
(45) Date of Patent: Jul. 31, 2012

(54) DEVICE AND METHOD FOR FETCHING INSTRUCTIONS

(75) Inventors: Ron Bercovich, Kfar-Saba (IL); Odi Dahan, Oranit (IL); Norman Goldstein, Ariel (IL); Yuval Kfir, Tel Mond (IL)

(73) Assignee: Freescale Semiconductor, Inc., Austin, TX (US)

( * ) Notice: Subject to any disclaimer, the term of this patent is extended or adjusted under 35 U.S.C. 154(b) by 389 days.

(21) Appl. No.: 12/516,742

(22) PCT Filed: Nov. 30, 2006

(86) PCT No.: PCT/IB2006/054525
§ 371 (c)(1),
(2), (4) Date: May 28, 2009

(87) PCT Pub. No.: WO2008/065479
PCT Pub. Date: Jun. 5, 2008

(65) Prior Publication Data
US 2010/0070713 A1    Mar. 18, 2010

(51) Int. Cl.
*G06F 12/08* (2006.01)
*G06F 9/30* (2006.01)

(52) U.S. Cl. ........ 711/125; 711/E12.017; 712/205; 712/E9.016

(58) Field of Classification Search .............. None
See application file for complete search history.

(56) References Cited

U.S. PATENT DOCUMENTS

| | | | |
|---|---|---|---|
| 6,345,320 | B1 | 2/2002 | Kawamata et al. |
| 7,461,210 | B1 * | 12/2008 | Wentzlaff et al. ......... 711/135 |
| 2001/0011330 | A1 | 8/2001 | Hughes et al. |
| 2004/0049615 | A1 | 3/2004 | Liang |
| 2005/0071571 | A1 | 3/2005 | Luick |

FOREIGN PATENT DOCUMENTS

| | | |
|---|---|---|
| EP | 1096371 B1 | 9/2004 |
| JP | 06096240 A | 4/1994 |
| JP | 10063574 A | 3/1998 |
| WO | 9736234 A1 | 10/1997 |

* cited by examiner

*Primary Examiner* — Denise Tran

(57) ABSTRACT

A device and a method for fetching instructions. The device includes a processor adapted to execute instructions; a high level memory unit adapted to store instructions; a direct memory access (DMA) controller that is controlled by the processor; an instruction cache that includes a first input port and a second input port; wherein the instruction cache is adapted to provide instructions to the processor in response to read requests that are generated by the processor and received via the first input port; wherein the instruction cache is further adapted to fetch instructions from a high level memory unit in response to read requests, generated by the DMA controller and received via the second input port.

20 Claims, 6 Drawing Sheets

DEVICE AND METHOD FOR FETCHING INSTRUCTIONS

FIELD OF THE INVENTION

The present invention relates to devices and methods for fetching instructions.

BACKGROUND OF THE INVENTION

Modern integrated circuits are required to perform multiple tasks at high speed. Each task, as well as multiple tasks, can be implemented by executing many instruction groups (also referred to as kernels). Usually, an instruction cache cannot store all the instruction groups, but rather only one or few instruction groups. Thus, once a new instruction group is required by the processor it should be fetched to the instruction cache.

In order to reduce the time (and performance) penalty resulting from fetching a new instruction group from a high level memory unit, unique pre-fetch instructions, to be executed by the processor, were developed. Various systems and method that use unique instructions are illustrated in European patent EP1096371B1 titled "A method and apparatus for prefetching instructions", and in PCT patent application serial number PCT/US96/19469 titled "Cache multi-block touch mechanism for object oriented computer system", both being incorporated herein by reference.

The execution of these dedicated instructions required to re-design the processor. Such re-design can be too costly, especially when the designers wish to re-use a processor that is not adapted to execute these unique instructions.

There is a need to provide efficient devices and methods for fetching instructions.

SUMMARY OF THE PRESENT INVENTION

A device and a method for fetching instructions, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

The device and method utilize a multi-port instruction cache that is able to receive read requests of instructions from a processor and from a DMA controller (that is conveniently controlled by the processor). The DMA controller can access the instruction cache and request instructions before these instructions are requested by the processor, thus reducing cache miss events resulting from processor requests to receive instructions.

Conveniently, a device having instruction fetch capabilities is provided. The device includes a processor adapted to execute instructions; a high level memory unit adapted to store instructions; a DMA controller that is controlled by the processor; an instruction cache that has a first input port and a second input port; wherein the instruction cache is adapted to provide instructions to the processor in response to read requests that are generated by the processor and received via the first input port. The instruction cache is further adapted to fetch instructions from a high level memory unit in response to read requests, generated by the DMA controller and received via the second input port.

Conveniently, a method for fetching instruction is provided. The method includes: sending, by a processor, via a first input port of the instruction cache, read requests; providing, by a direct memory access (DMA) controller, via a second input port of the instruction cache, read requests; fetching instructions from a high level memory unit to the instruction cache in response to the received read requests; and providing instructions to the processor.

Conveniently, a first instruction group is loaded to the instruction cache from a higher level memory while another instruction group is being executed by the processor. Once the first instruction group is started to be executed the instruction cache is refreshed by sending to the instruction cache read requests to that first instruction group.

Figure 1:
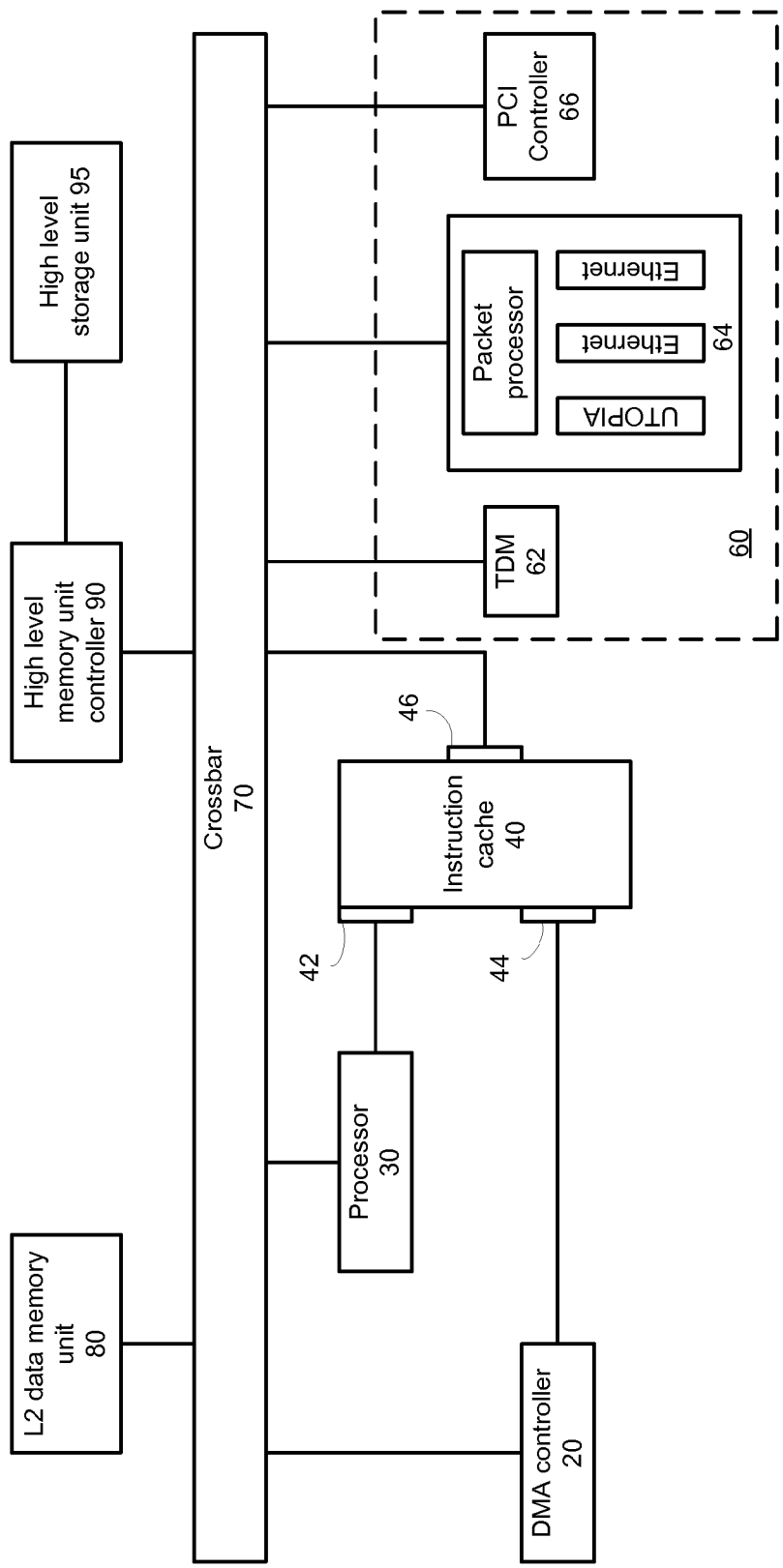
FIG. 1 illustrates a device having instruction fetching capabilities according to an embodiment of the invention.

FIG. 1 illustrates device 10 having instruction fetching capabilities according to an embodiment of the invention.

Device 10 includes: processor 30, direct memory access (DMA) controller 20, instruction cache 40, crossbar 70, high level memory controller 90, high level memory unit 95, level two (L2) data memory unit 80, and multiple communication protocol interfaces collectively denoted 60.

Processor 30 usually includes (or is connected to) a level one (L1) instruction cache and a L1 data cache, but they are not shown for simplicity of explanation.

High level memory unit 95 is a level three (L3) memory unit, but this is not necessarily so.

Crossbar 70 connects between processor 30, DMA controller 20, instruction cache 40, L2 data memory unit 80 and optional communication protocol interfaces 60.

Device 10 includes a TDM interface 62, PCI controller 66. Device 10 also includes UTOPIA interface, two Ethernet interfaces and a packet processor collectively denoted 64.

Instruction cache 40 includes a first input port 42, a second input port 44 and a third port 46. Instruction cache 40 can receive read requests from processor 30 to get instructions (that are eventually executed by processor 30) and can receive read requests from DMA controller 20 to fetch instructions into the instruction cache.

While processor 30 receives instructions from instruction fetch 40, DMA controller 20 triggers the fetching of instructions to the instruction cache 40, but does not receive the fetched instructions.

Read requests from DMA controller 20 are received via second input port 44 while read requests from processor 30 are received via first input port 42.

DMA controller 20 can access instruction cache 40 without interrupting the execution of the program and without altering the connectivity between the instruction cache 40 and processor 30, thus allowing a re-use of these connections.

Processor 30 executes software that can include instructions that manage the pre-fetching of instructions, especially by instructing the DMA controller 20 (by sending DMA control commands) to provide read requests to the instruction cache 40. The pre-fetching is designed such that an instruction group is fetched to the instruction cache (in response to read requests from DMA controller) before the processor 30 starts to execute this instruction group.

According to an embodiment of the invention the DMA controller sends multiple read requests that cause multiple cache miss events. These cache miss events cause instruction cache 40 to fetch these instructions from the high level memory unit 95. The fetching of instructions from the high level memory unit 95, via high level memory unit controller 90 and crossbar 70 is done using the third port 46 of instruction cache 40.

The read requests generated by DMA controller 20 and the read requests generated by processor 30 are mutually asynchronous. Accordingly, each of these components (processor 30, DMA controller 20) can generate read requests regardless of read requests generated by the other component. Thus, processor 30 can fetch and execute instructions without synchronizing its read requests with those issued by DMA controller 20.

DMA controller 20 conveniently requests instructions that are expected to be executed by processor 30, so that when processor 30 requests an instructions that instruction will be usually already stored in instruction cache 40.

It is noted that both processor 30 and DMA controller 20 can generate (at least during a certain time) read requests that are associated with instructions that belong to the same instruction group. Instruction cache 40 responds to each request according to the presence of that instruction within instruction cache 40.

Processor 30 usually requests an instruction from instruction cache 40, then executes it and finally fetches the next instruction. DMA controller 20, on the other hand, just sends one read request after the other. Accordingly, the execution period of an instruction group is much longer (conveniently at least ten time longer) than an instruction read period during which DMA controller 20 generates read requests that read the entire instruction group.

DMA controller 20 can send read requests at a rate that is not responsive to the execution rate of processor 30.

According to an embodiment of the invention processor 30 is adapted to execute multiple instruction groups. These instruction groups can be executed in a cyclic manner, according to a predefined pattern and the like. Processor 30 is also adapted to execute intermediate instruction groups that are responsive, among other things, to the fetching of instructions to the instruction cache.

At least one instruction of the intermediate instruction group, when executed by processor 30, causes processor 30 to send to DMA controller 20 at least one DMA control command, indicating which read requests to send to instruction cache 40.

Instruction cache 40 can store one or more portions of instruction groups as well as one or more intermediate instruction groups.

The following tables illustrate various exemplary operational scenarios of device 10 and especially of processor 30 and DMA controller 20. It is assumed that instruction cache 40 stores less than two instruction groups and that it accesses the high level memory unit 95 when a cache miss occurs.

TABLE 1 illustrates a serial fetch approach in which DMA controller 20 starts to fetch instructions that belong to a certain instruction group after the previous instruction group was executed by processor 30. The read request rate is usually much faster than the execution rate of the instructions, thus after a relatively short delay the processor 30 can request instructions from instruction cache without causing cache miss events.

Conveniently the DMA controller 20 receives the following instruction from processor 20:
WRITE_UINT32 (g_msc814x_ccsr->dma.dma_chcr [DMA_PUT_REF_BASE_CH+core_num], 0xA0000000);
wherein DMA_PUT_REF_BASE_CH refers to a predefined channel that performs the required transfer.

FIG. 2-FIG. 5 are timing diagrams 102-105 illustrating the operations of DMA controller 20 and processor 30 according to an embodiment of the invention.

Figure 2:
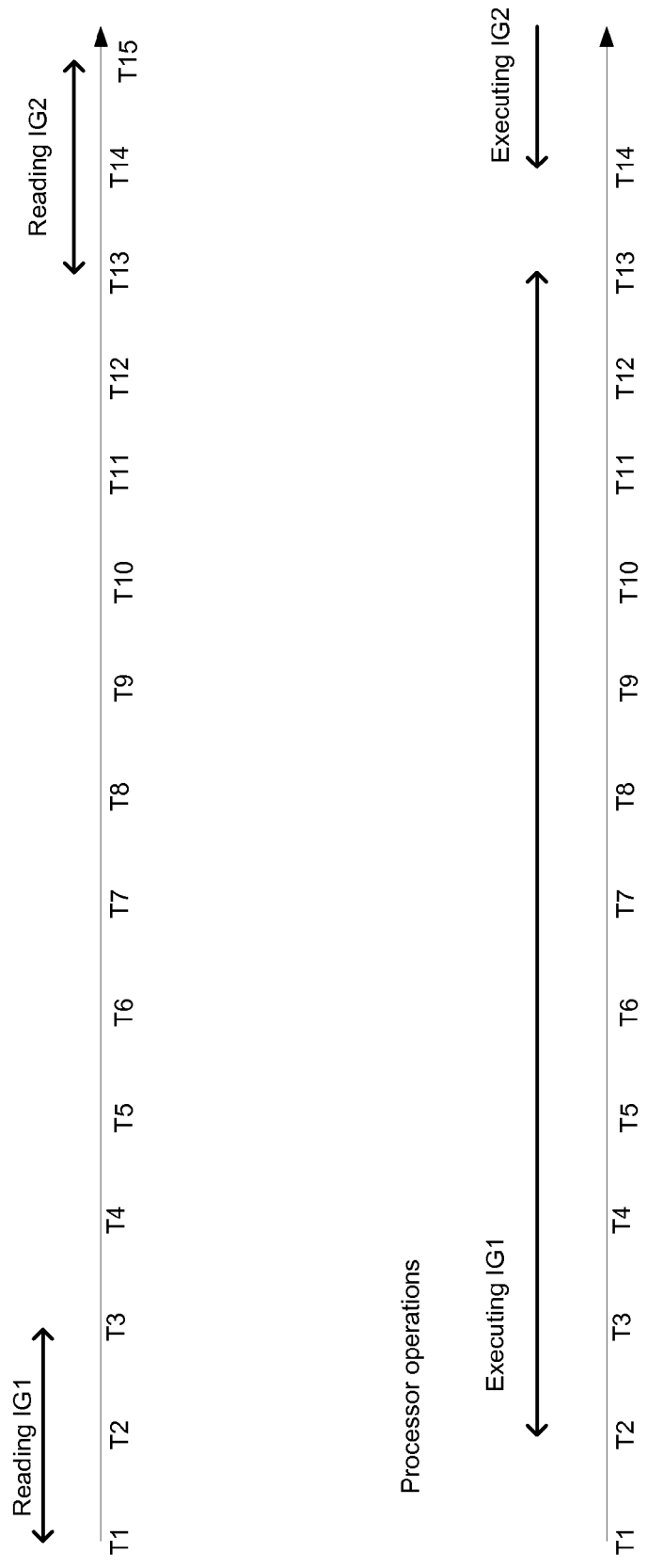
FIG. 2 is a timing diagram illustrating multiple instruction fetching operations.

Timing diagram 102 of FIG. 2 illustrates DMA controller 20 as staring to send read requests to instruction cache 40 before (even slightly before) processor 30 starts executing the instruction group, but this is not necessarily so. For example both components can start sending read requests related to the first instruction group substantially simultaneously.

DMA controller 30 sends read requests of instructions that belong to instruction group IG1 during T1-T3.

Processor requests instructions that belong to IG1 and execute them during T2-T13.

It is assumed that at T1 instruction cache 40 does not store any instruction of IG1 and that at T2 (between T1 and T3) processor 30 can start executing instructions of IG1 although instruction cache 40 does not store the whole IG1, as DMA controller 30 completes sending requests to read instructions that belong to IG1 at T3.

It is assumed that processor 30 completes executing IG1 at T13.

DMA controller 30 sends read requests of instructions that belong to instruction group IG2 during T13-T15.

Processor requests instructions that belong to IG1 and execute them during T14-T26 (not shown).

It is assumed that at T13 the instruction cache does not store any instruction of IG1 and that at T14 (between T13 and T15) processor 30 can start executing instructions of IG1 although instruction cache 40 does not store the whole IG1, as DMA controller 30 completes sending requests to read instructions that belong to IG2 at T15.

It is assumed that processor 30 completes executing IG1 at T13.

Figure 3:
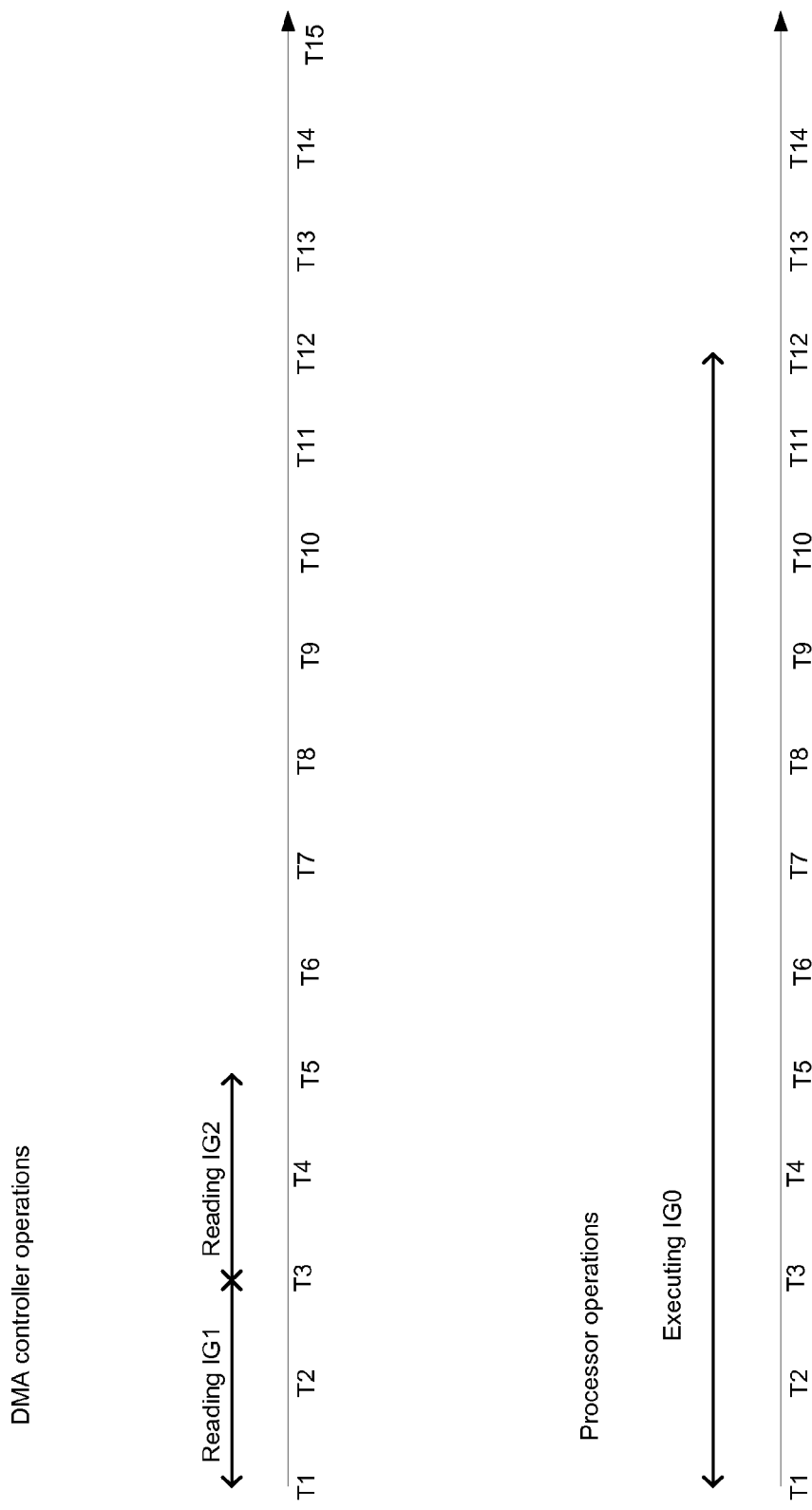
FIG. 3 is a timing diagram illustrating multiple instruction fetching operations.

Timing diagram 103 of FIG. 3 illustrates a more pipelined scenario during which DMA controller 20 sends read requests to read a second instruction group while processor 30 executes a first instruction group that differs from the second instruction group.

DMA controller 30 sends read requests of instructions that belong to instruction group IG1 during T1-T3. It then sends read requests of instructions that belong to instruction group IG2 during T3-T5.

Processor requests instructions that belong to IG0 and execute them during T1-T12.

It is assumed that at T1 instruction cache 40 stores all the instructions that belong to IG0.

Figure 4:
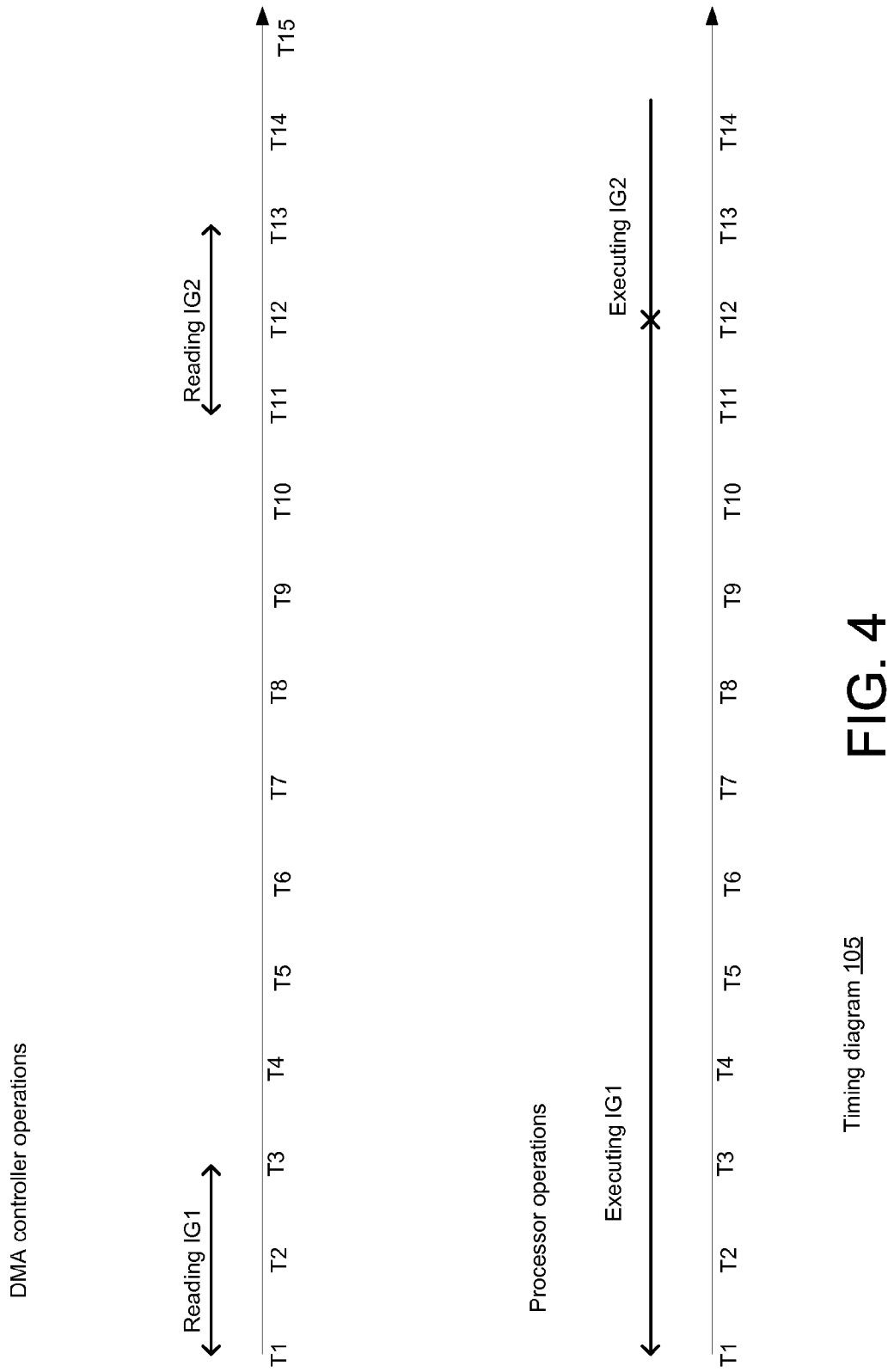
FIG. 4 is a timing diagram illustrating multiple instruction fetching operations.

Timing diagram 104 of FIG. 4 illustrates a pipelined request scenario during which DMA controller 20 and processor 30 send, during a certain period (between T12 and T13), read requests that relate to instructions that belong to the same instruction group (IG2). During this period cache miss events can occur.

DMA controller 30 sends read requests of instructions that belong to instruction group IG1 during T1-T3.

Processor requests instructions that belong to IG1 and execute them during T1-T12.

It is assumed that processor 30 completes executing IG1 at T12.

DMA controller 30 sends read requests of instructions that belong to instruction group IG2 during T11-T13.

Processor requests instructions that belong to IG2 and execute them during T12-T24 (not shown).

Figure 5:
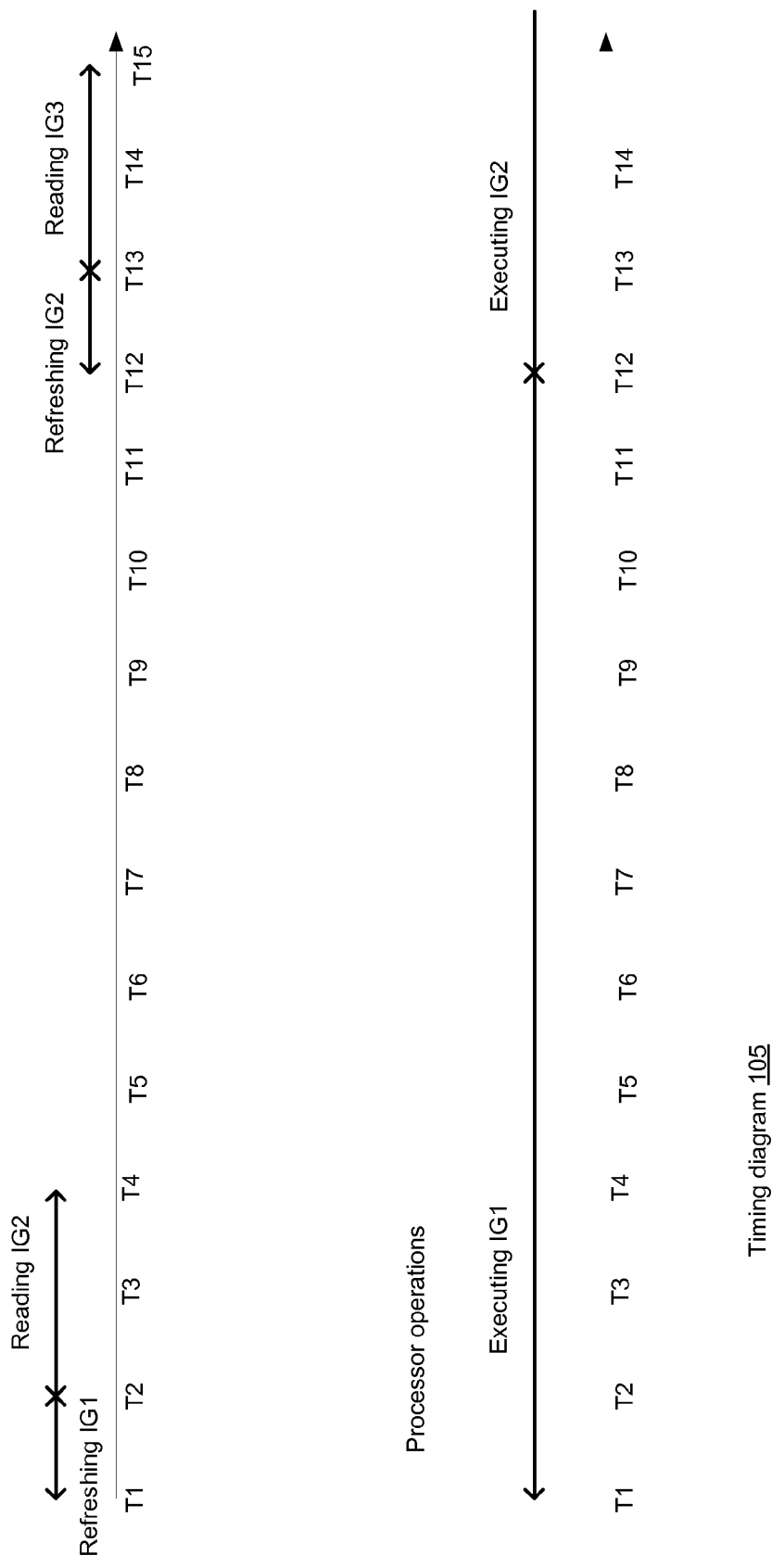
FIG. 5 is a timing diagram illustrating multiple instruction fetching operations.

Timing diagram 105 of FIG. 5 illustrates another scenario in which DMA controller 20 sends requests to read instructions that belong to a certain instruction group before processor 30 executes this certain instruction group IG1 and when processor 30 starts executing that certain instruction group DMA controller 20 sends read requests that refresh instruction cache 40 (that already stores these instructions).

It is noted that DMA processor 20 can refresh instruction cache 40 (by sending read requests to instructions that belong to a certain instruction group) before processor 30 starts executing the certain instruction group.

The second iteration of the read instructions provided by DMA controller 30 is aimed prevent the deletion of instructions fetched during the first iteration. The second iteration of the read instruction is short as the instructions are located in the cache are each read request is followed by an instruction cache hit.

DMA controller 30 refreshes instruction cache 40 by sending read requests of instructions that belong to instruction group IG1 during T1-T2. DMA controller 30 sends read requests of instructions that belong to instruction group IG2 during T2-T4.

Processor requests instructions that belong to IG1 and executes them during T1-T12.

It is assumed that at T1 instruction cache 40 stores instruction group IG1.

DMA controller 30 refreshes instruction cache 40 by sending read requests of instructions that belong to instruction group IG2 during T12-T13. DMA controller 30 sends read requests of instructions that belong to instruction group IG3 during T13-T15.

Processor requests instructions that belong to IG2 and executes them during T12-T24 (not shown).

Figure 6:
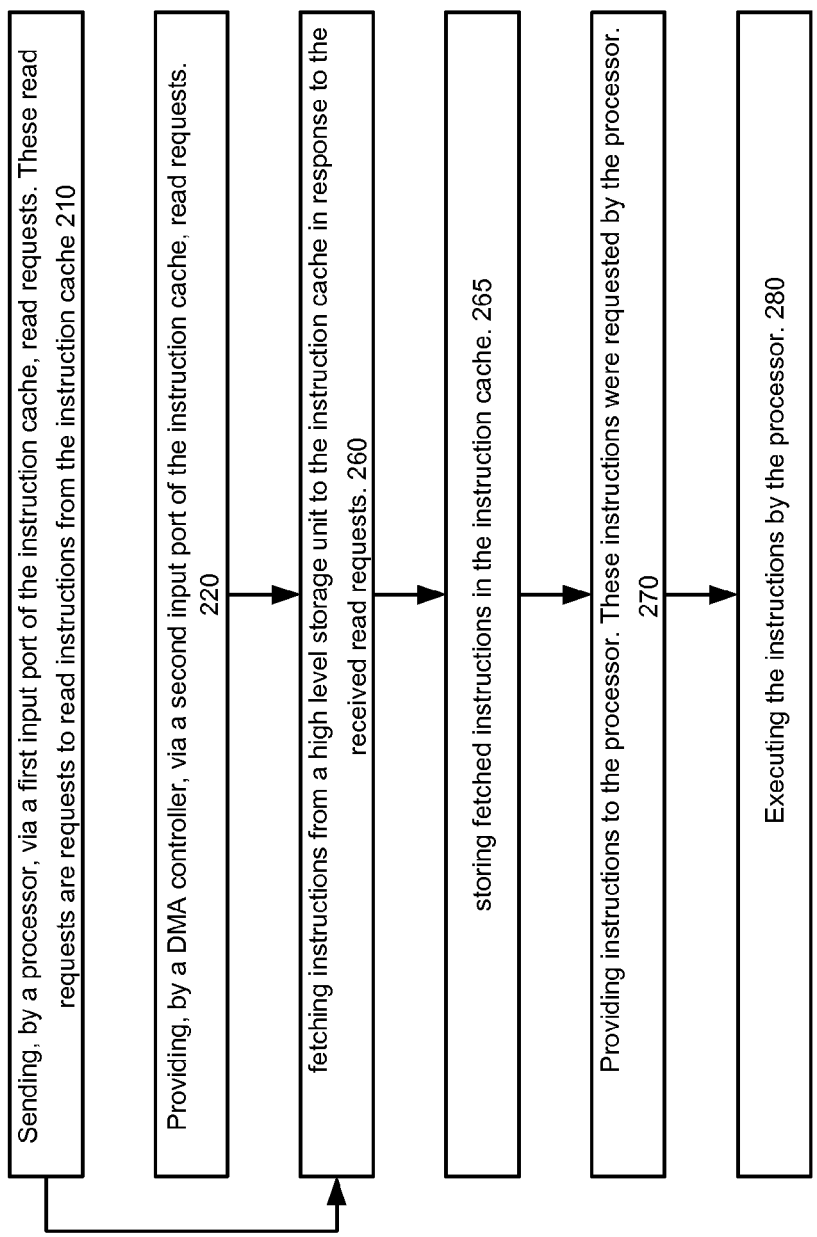
FIG. 6 illustrates a method for fetching instructions, according to an embodiment of the invention.

FIG. 6 illustrates method 200 for fetching instructions, according to an embodiment of the invention.

Method 200 includes multiple stages that can be repeated and can partially or fully overlap. The execution of a certain instruction group can be at least partially executed while the next instruction group is fetched in response to read requests provided by a DMA controller. The read requests of the DMA controller can be responsive to DMA control commands generated by a processor, wherein these DMA control commands are executed in response to previously fetched instructions.

Method 200 starts by stages 210 and 220 or by any one of stages 210 and 220, as the timing of read requests generated by the processor and the DMA controller are mutually asynchronous. It is assumed that the DMA controller is responsible for pre-fetching instructions to the instruction cache, and that in an optimal scenario, the pre-fetching performed by the DMA controller causes the instruction cache to stores instructions before they are requested by the processor, so that instruction cache miss occur in response to DMA controller originated requests.

Stage 210 includes sending, by a processor, via a first input port of the instruction cache, read requests. The se read requests are requests to read instructions from the instruction cache. If these instructions are stored in the instruction cache ("cache hit") then they are provided to the processor, else ("cache miss") these instructions are fetched, by the instruction cache, from a high level memory unit.

Stage 220 includes providing, by a DMA controller, via a second input port of the instruction cache, read requests.

Stages 220 and 210 are followed by stage 260 of fetching instructions from a high level memory unit to the instruction cache in response to the received read requests.

Conveniently, stage 220 of providing, is responsive to a receiving, by the DMA controller, at least one DMA control command from the processor.

Stage 260 is followed by stage 265 of storing fetched instructions in the instruction cache. Stage 265 can include storing a portion of a first instruction group, an intermediate instruction group and a portion of a second instruction group. The intermediate instruction group causes the processor to send at least one DMA command to the DMA controller.

Stage 265 is followed by stage 270 of providing instructions to the processor. These instructions were requested by the processor.

Stage 270 is followed by stage 280 of executing the instructions by the processor.

Conveniently, stage 280 includes executing instructions that belong to a first group of instructions and it can be executed during the execution of stage 220 of providing, by the DMA controller, read requests to read instructions that belong to a second instruction group.

Conveniently, stage 220 includes receiving multiple read requests at a rate that is independent of an execution rate of the instructions fetched by the instruction cache.

Conveniently, at a certain time the stage 220 of providing and stage 210 of sending are associated with instructions that belong to the same instruction group.

Conveniently, read requests associated with the providing and with the sending are mutually asynchronous and wherein stage 260 of fetching includes fetching an instruction in response to a presence of the instruction in the instruction cache.

Conveniently, the same instructions can be requested, during two iterations of stage 220. During a first iteration of stage 220 the processor executes instructions that belong to another instruction group. The second iteration of stage 220 occurs when the processor starts executing the previously requested instructions. The second iteration can assist in refreshing the instruction cache, and prevent the deletion of instructions that were pre-fetched but not yet executed by the processor.

Conveniently, stage 220 includes starting to generate read requests of instructions that belong to a certain instruction group immediately before executing, by the processor, that certain instruction group.

Conveniently, stage 280 of executing includes executing an instruction group during an execution period. Stage 220 of providing includes providing read requests to receive the instruction group during a read request period. The execution period of the instruction group is at least ten times longer that the read request period.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device having instruction fetch capabilities, the device comprises:

a processor adapted to execute instructions;

a high level memory unit adapted to store instructions;

a direct memory access (DMA) controller that is controlled by the processor;

an instruction cache that comprises a first input port and a second input port, the instruction cache adapted to provide instructions to the processor in response to read requests that are generated by the processor and received via the first input port, and the instruction cache is further adapted to fetch instructions from a high level memory unit in response to read requests generated by the DMA controller and received via the second input port, but is not adapted to return the instructions to the DMA controller.

2. The device according to claim 1 wherein DMA controller is adapted to generate read requests in response to at least one DMA control command sent from the processor.

3. The device according to claim 1 wherein the DMA controller is adapted to send read requests to read a second instruction group while the processor executes a first instruction group that differs from the second instruction group.

4. The device according to claim 1 wherein DMA controller generates multiple read requests regardless of an execution rate of the instructions.

5. The device according to claim 1 wherein at a certain time the DMA controller and the processor generate read requests for instructions that belong to the same instruction group.

6. The device according to claim 5 wherein the read requests sent by the processor and by the DMA controller are mutually asynchronous and wherein the instruction cache determines which instructions out of the instruction group to fetch from the high level memory unit in response to a presence of requested instructions in the instruction cache.

7. The device according to claim 1 wherein the DMA controller is adapted to generate requests to read instructions of a second instruction group while the processor executes a first instruction group and wherein the DMA controller is further adapted to re-send at least one read request to fetch at least one instruction from the second instruction group while the processor executes the second instruction group.

8. The device according to claim 1 wherein the DMA controller is adapted to start generating read requests of instructions that belong to a certain instruction group immediately before the processor starts an execution of that certain instruction group.

9. The device according to claim 1 wherein the instruction cache is adapted to store a portion of a first instruction group, an intermediate instruction group and a portion of a second instruction group; wherein the intermediate instruction group comprises at least one DMA control instruction that when executed by the processor causes the processor to sent at least one DMA command to the DMA controller.

10. The device according to claim 1 wherein an execution period of an instruction group is at least ten times longer that a read request period during which the DMA controller sends read requests to read the instruction group from the instruction cache.

11. A method for fetching instructions, the method comprises:
providing instructions to a processor;
sending, by a processor, via a first input port of the instruction cache, first read requests;
sending, by the processor to a direct memory access controller, at least one DMA control command identifying a set of instructions to be fetched by the DMA controller, the set of instructions to be executed by the processor;
providing, by a direct memory access (DMA) controller, via a second input port of the instruction cache, second read requests for the set of instruction; and
fetching instructions from a high level memory unit to the instruction cache in response to the received first and second read requests.

12. The method according to claim 11 further comprising executing, by the processor, instructions that belong to a first group of instructions and that are fetched in response to the first read requests while providing, by the DMA controller, the first and second read requests to read instructions that belong to a second instruction group.

13. The method according to claim 11 wherein the providing by the DMA controller, comprises providing multiple read requests at a rate that is independent of an execution rate of the instructions fetched by the instruction cache.

14. The method according to claim 11 wherein at a certain time the providing and sending are associated with instructions that belong to the same instruction group.

15. The method according to claim 14 read requests associated with the providing and the sending are mutually asynchronous and wherein the fetching comprises fetching an instruction in response to a presence of the instruction in the instruction cache.

16. The method according to claim 11 wherein the method comprises:
providing read requests to read instructions that belong to a second instruction group while executing, by the processor, instructions that belong to a first instruction group; and
providing read requests to read the instructions that belong to the second instruction group while executing, by the processor, instructions that belong to the second instruction group.

17. The method according to claim 11 wherein the providing comprises starting to generate the second read requests for the set of instructions immediately before executing, by the processor, the set of instruction group.

18. The method according to claim 11 wherein the fetching is followed by storing fetched instructions in the instruction cache; wherein the storing comprises storing a portion of a first instruction group, an intermediate instruction group and a portion of a second instruction group; wherein the intermediate instruction group causes the processor to send at least one DMA command to the DMA controller.

19. The method according to claim 11 wherein the executing comprises executing an instruction group during an execution period; and wherein the providing comprises providing read requests to receive the instruction group during a read request period and wherein the execution period of an instruction group is at least ten times longer that the read request period.

20. The method according to claim 11 wherein the set of instructions requested by the DMA controller are not to be returned to the DMA controller.

* * * * *